US011480533B1

(12) United States Patent
Schiefelbein (10) Patent No.: US 11,480,533 B1
(45) Date of Patent: Oct. 25, 2022

(54) MULTI-SCAN COMPUTED TOMOGRAPHY DEFECT DETECTABILITY

(71) Applicant: Honeywell Federal Manufacturing & Technologies, LLC, Kansas City, MO (US)

(72) Inventor: Bryan E. Schiefelbein, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 17/720,959

(22) Filed: Apr. 14, 2022

(51) Int. Cl.
*G01N 23/04* (2018.01)
*G01N 23/18* (2018.01)
*G01N 23/046* (2018.01)
*G01B 15/06* (2006.01)

(52) U.S. Cl.
CPC ........... *G01N 23/18* (2013.01); *G01N 23/046* (2013.01); *G01N 2223/1003* (2013.01); *G01N 2223/3035* (2013.01); *G01N 2223/419* (2013.01); *G01N 2223/646* (2013.01)

(58) Field of Classification Search
USPC ............................... 378/4, 18–20, 62, 57, 58
See application file for complete search history.

(56) References Cited

U.S. PATENT DOCUMENTS 5,793,835 A 8/1998 Blanck
5,867,553 A * 2/1999 Gordon .................. A61B 6/032
378/146
6,047,041 A 4/2000 Ellinger
6,317,482 B1 11/2001 Stefko
7,056,019 B1 6/2006 Hanson et al.
(Continued)

FOREIGN PATENT DOCUMENTS

DE 102019219173 A1 6/2021

OTHER PUBLICATIONS

Plessis, A. et al.; X-Ray Microcomputed Tomography in Additive Manufacturing: A Review of the Current Technology and Applications; 3D Printing and Additive Manufacturing; 2018; pp. 227-247; vol. 5, No. 3; Mary Ann Liebert, Inc.
(Continued)

*Primary Examiner* — Irakli Kiknadze
(74) *Attorney, Agent, or Firm* — Erise IP, P.A.

(57) ABSTRACT

Systems and methods for representing internal defects of an object to determine defect detectability using a multi-scan computed tomography (CT) approach are disclosed. A defect-free object may be scanned using a CT machine. In one or more separate scans, phantom defects may be imaged and the resulting projections combined and reconstructed to represent internal defects. The air-normalized intensities of the object and the phantom defect may be used to represent voids and inclusions. Subtraction of materials may be represented by the quotient of the air-normalized intensities thereof, and the addition of materials may be represented by the product of the air-normalized intensities thereof. A void may be represented by subtracting a phantom defect scan from the object scan. An inclusion may be represented by creating a void, scanning an additional phantom defect, and adding the additional phantom defect in the volume created by the void.

20 Claims, 5 Drawing Sheets

(56) References Cited

U.S. PATENT DOCUMENTS

| | | | |
|---|---|---|---|
| 8,831,895 | B2 | 9/2014 | Hedl et al. |
| 9,625,257 | B2 | 4/2017 | Christoph et al. |
| 9,934,603 | B2 | 4/2018 | Goodenough et al. |
| 10,354,374 | B1 | 7/2019 | Prindiville |
| 10,393,677 | B2 | 8/2019 | Bartl et al. |
| 10,520,453 | B2 * | 12/2019 | Monkawa ............ G01N 23/046 |
| 10,702,221 | B2 | 7/2020 | Ji et al. |
| 2015/0254817 | A1 * | 9/2015 | Batzinger ................ G06T 5/006 378/4 |
| 2015/0300963 | A1 * | 10/2015 | Haidekker ............ G06T 11/008 382/131 |
| 2016/0133031 | A1 * | 5/2016 | Keyaki .................. A61B 6/032 378/20 |
| 2017/0370859 | A1 | 12/2017 | Gay et al. |

OTHER PUBLICATIONS

Lozanovski, B. et al.; Image-Based Geometrical Characterization of Nodes in Additively Manufactured Lattice Structures; 3D Printing and Additive Manufacturing; 2021; pp. 51-68; vol. 8, No. 1; Mary Ann Liebert, Inc.

Colosimo, B. et al.; Complex Geometries in Additive Manufacturing: A New Solution for Lattice Structure Modeling and Monitoring; Journal of Quality Technology; Jun. 30, 2021; pp. 1-24; American Society for Quality.

Frangi, A. et al.; Multiscale Vessel Enhancement Filtering; Image Sciences Institute; 1998; pp. 130-137.

Rathore, J. et al.; A methodology for CT based non-destructive geometrical evaluations of lattice structures by holistic strut measurement approach; HAL open science; 2020; hal-03079838; pp. 1-26.

Sercombe, T. et al.; Failure modes in high strength and stiffness to weight scaffolds produced by Selective Laser Melting; Materials and Design; 2015; vol. 67; pp. 501-508; Elsevier.

Thompson, A. et al.; X-ray computed tomography for additive manufacturing: a review; Measurement Science and Technology; 2016; pp. 1-17; IOP Publishing.

Zanini, F. et al.; X-ray computed tomography for metal additive manufacturing: challenges and solutions for accuracy enhancement; Procedia CIRP; 2018; pp. 114-118; Elsevier.

Echeta, I. et al.; Review of defects in lattice structures manufactured by powder bed fusion; The International Journal of Advanced Manufacturing Technology; 2020; vol. 106; pp. 2649-2668.

Elmi A. et al.; Experimental and numerical investigation of selective laser melting-induced defects in Ti—6Al—4V octet truss lattice material: the role of material microstructure and morphological variations; Journal of Materials Research 2020; vol. 35, Issue 15; pp. 1900-1912.

Prindiville, J.; Evaluation of Computed Tomography Techniques and Inspections; Prindiville Digital Radiography Consulting, LLC; pp. 1-16.

Jerman, T.; Beyond Frangi: an improved multiscale vesselness filter; University of Ljubljana, Faculty of Electrical Engineering; Trzaska 25, SI-1000; Ljubljana, Slovenia; Mar. 2015.

* cited by examiner

MULTI-SCAN COMPUTED TOMOGRAPHY DEFECT DETECTABILITY

STATEMENT OF GOVERNMENTAL SUPPORT

This invention was made with government support under DE-NA0002839 awarded by the United States Department of Energy/National Nuclear Security Administration. The government has certain rights in the invention.

BACKGROUND

1. Field

Embodiments of the invention relate to systems and methods for determining defect detectability of an object using computed tomography (CT). More specifically, embodiments of the invention relate to representing internal defects in an object using a multiple-scan CT approach to determine the defect detectability of the object.

2. Related Art

Identifying internal defects of a part is important for quality assurance purposes. For example, for additively manufactured parts, defects may result from the printing process and can negatively affect the mechanical properties of the part. Such defects are often internal to the part, such as voids or inclusions.

Nondestructive testing comprises various techniques for analyzing parts for material properties, defects, and other properties without damaging the part. Nondestructive testing generally saves both time and cost for manufacturers and is, therefore, desirable to use for quality assurance and research and development purposes. Computed tomography is one type of nondestructive testing technique that utilizes a large number of digital radiographs to reconstruct a two-dimensional or three-dimensional dataset. In 2D radiography, image quality indicators (IQIs) can be used to determine defect detectability and the quality of the radiograph. Placing an IQI external to the object being imaged results in a useful representation of the IQI as if it were internal to the object. However, IQIs are unable to be used for 3D computed tomography, as placing an IQI external to an object for a 3D CT scan results in the IQI showing up as external to the object when the scan is reconstructed.

Typically, to ensure that a defect of a given size and attenuation is detectable in a CT scan, a reference standard of the part with the defect therein must be created. Such a reference standard is cost ineffective and inflexible as many additional reference standards may need to be fabricated for different defects (e.g., a smaller size defect at a different location in the part). Thus, a need exists to represent internal defects in a part that does not rely upon the creation of a reference standard.

Previous methods of simulating a defect in a CT-scanned part utilize a single-scan approach in which a phantom is placed on a secondary turntable added to a CT device and scanned in-line with the part. By using a single-scan approach only inclusions may be represented as the phantom is additive with the part when scanned. Further, the addition of a secondary turntable to existing CT devices requires substantial modifications thereto and incurs additional costs. Further still, when reconstructing CT images, if the distance between the X-ray source and the object changes (source-to-object distance), a magnification factor thereof changes. Thus, to reconstruct an image with a phantom and an object having different source-to-object distances, as is the case when disposing the phantom and the object on two separate turntables, the phantom size needs to be adjusted to account for the change in magnification to correctly represent the defect. If the size of the simulated defect needs to be changed, the defect material may also need to be changed to match the attenuation needed for the defect. Thus, the single-scan approach is inflexible because changes to the object geometry necessitate further changes to the phantom to ensure the defect is accurately represented within the object.

What is needed are improved systems and methods for representing internal defects in a part to determine the defect detectability of the part. Further, what is needed are systems and methods for representing both void defects and inclusion defects in a part. Further still, what is needed are systems and methods for determining defect detectability wherein the defect size and material can match the defect of interest.

SUMMARY

Embodiments of the invention solve the above-mentioned problems by providing systems and methods for representing internal defects in an object to determine the defect detectability thereof. Phantom defects may be used to represent voids and/or inclusions in an object. A phantom defect may be an object that comprises material and geometry that mimic that of an actual defect within the object. To represent internal defects, a multi-scan CT approach may be used, and each of the multiple scans may be combined to reconstruct the object comprising the defects represented internally. A first scan may be taken of the object. The object may be a defect-free object. After scanning the object, at least one additional scan of one or more phantom defects may be scanned. To represent a void, a void phantom defect may be scanned that comprises the same material as the object. Thereafter, the void defect phantom scan may be subtracted from the object scan, thus representing a void within the object. To represent an inclusion, a void phantom defect and an inclusion phantom defect phantom may be scanned in separate scans. The void phantom defect scan may be subtracted from the object scan to represent a void, followed by adding the inclusion phantom defect scan in the place of the void, thus representing an inclusion within the object.

A first embodiment of the invention is directed to a system for determining defect detectability of an object by representing internal defects in the object using computed tomography, the system comprising: at least one defect phantom, a positioning apparatus disposed on a manipulator of a computed tomography device, and one or more non-transitory computer-readable media that, when executed by at least one processor, perform a method for determining defect detectability of the object by representing internal defects in the object using computed tomography. The method may comprise: receiving a first dataset from a first scan of the object, receiving a second dataset from a second scan of the at least one defect phantom, the at least one defect phantom disposed on the positioning apparatus, combining the first dataset and the second dataset to obtain a combined dataset, reconstructing the combined dataset to generate a reconstructed volume, and determining a defect detectability of the object using the reconstructed volume.

A second embodiment of the invention is directed to a method of determining defect detectability of an object by representing internal defects in the object using computed tomography, the method comprising providing a computed tomography device, positioning the object on a manipulator of the computed tomography, performing a first scan of the object using the computed tomography device to obtain a first dataset, removing the object from the manipulator, positioning a defect phantom on the manipulator in a volume defined by the object, performing a second scan of the defect phantom using the computed tomography device to obtain a second dataset, combining the first dataset and the second dataset to obtain a combined dataset, and reconstructing the combined dataset to generate a reconstructed volume.

A third embodiment of the invention is directed to one or more non-transitory computer-readable media storing computer-executable instructions that, when executed by at least one processor, perform a method of determining defect detectability of an object by representing internal defects in the object using computed tomography, the method comprising performing a first scan of an object using the computed tomography device to obtain a first dataset, the object disposed on a manipulator of the computed tomography device, performing a second scan of at least one defect phantom using the computed tomography device to obtain a second dataset, the at least one defect phantom located within a volume defined by the object, combining the first dataset and the second dataset to obtain a combined dataset, reconstructing the combined dataset to generate a reconstructed volume, and determining a defect detectability of the object using the reconstructed volume.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Disclosed embodiments generally relate to representing internal defects in an object using a multi-scan computed tomography (CT) approach to determine the defect detectability of the object. A computed tomography device may comprise an x-ray source, a manipulator, and a detector. In computed tomography, inspection is performed by exposing an object to x-ray radiation and collecting the resulting exposure. X-ray sources generate photons that pass through the object and are attenuated by the object primarily through absorption and scatter (coherent and incoherent). When the photons reach the detector, the photons generate an electrical response that can be used to generate projection data, such as a sinogram. The projection data can then be reconstructed to generate a reconstructed dataset (e.g., a three-dimensional reconstructed image/volume) of the scanned object. As discussed below, Beer-Lambert's law, describing the linear attenuation in a material, may be used to combine the intensities of separate objects (e.g., an object and a defect phantom) to represent internal defects in the object.

For the multi-scan CT approach, the object may be disposed on the manipulator and a first scan performed thereon. The object may then be removed from the CT device. One or more void defect phantoms configured to represent one or more void defects in the object may be placed on the manipulator and a second scan performed. The two scans may then be combined and reconstructed to represent an internal void defect (i.e., an unwanted absence of material) in the object. A void may be represented by subtracting the void defect scan from the object scan. To represent an inclusion (i.e., an unwanted addition of material), a third scan may be taken of one or more inclusion defect phantoms that are added to the manipulator in place of corresponding void defect phantoms. After subtracting the void defect scan from the object scan, the inclusion defect scan may be added to the combined scan to represent an internal inclusion. By maintaining a substantially constant source-to-object distance, the phantom defects may not need to be altered to account for a change in magnification.

Figure 1A:
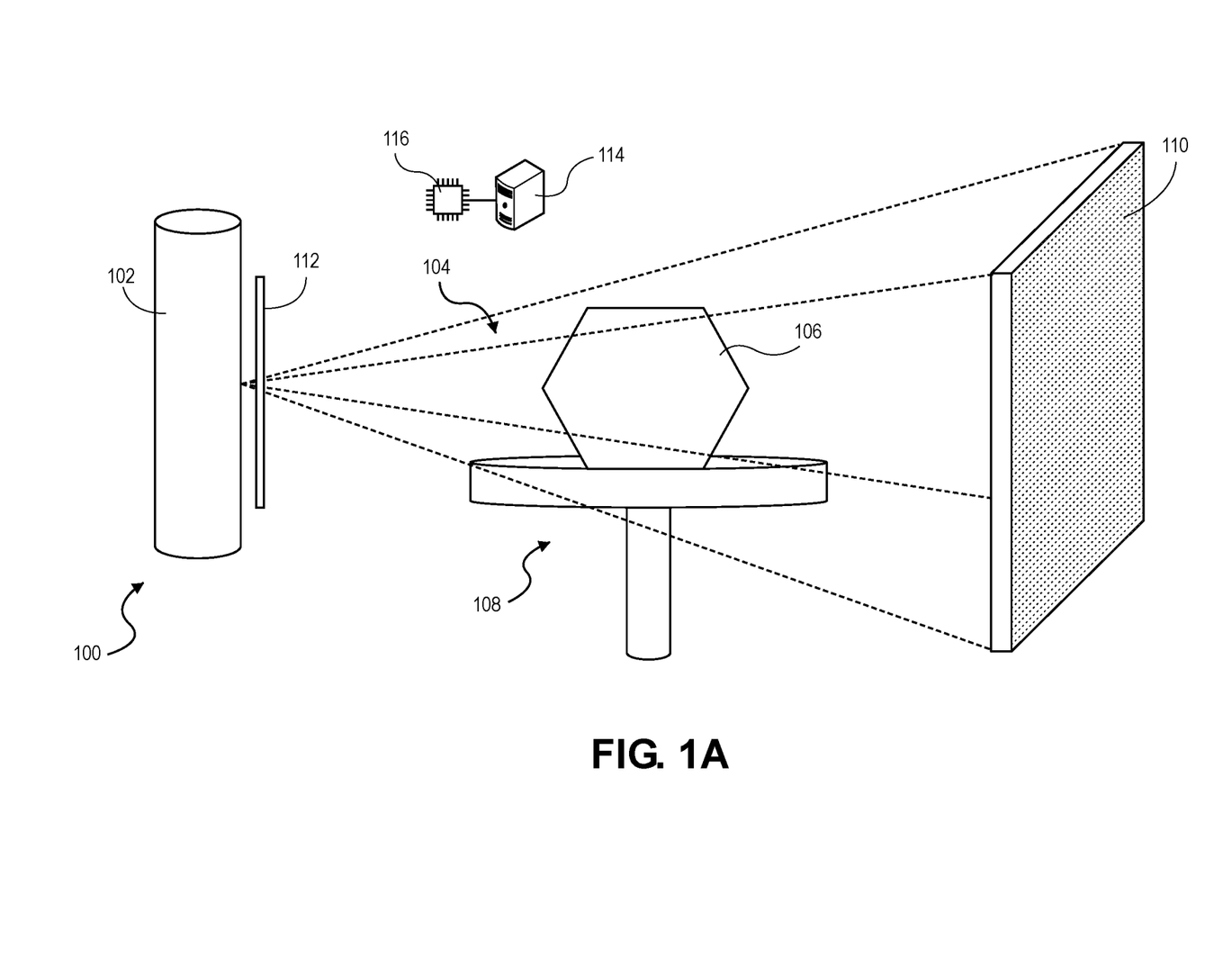
FIG. 1A illustrates a computed tomography system for scanning an object for some embodiments.

FIG. 1A illustrates a CT system 100 for representing internal defects in an object to determine the defect detectability thereof using multiple CT scans for some embodiments. CT system 100 may comprise an X-ray source 102 configured to emit an X-ray beam 104. During a scan, photons from the X-ray beam 104 may pass through an object 106, disposed on manipulator 108, before reaching detector 110. When the photons strike detector 110, an electrical response may be generated which may be converted into a radiographic projection that can be used to reconstruct the dataset of object 106. In some embodiments, one or more filters 112 is provided to filter x-ray beam 104. A computer 114 may control operations of CT system 100, as discussed below.

X-ray source 102 may be an x-ray tube or any other type of x-ray emitter. In some embodiments, x-ray source 102 is a microfocus x-ray tube (e.g., solid-anode or metal-jet-anode), a minifocus tube, a nanofocus tube, or the like. In some embodiments, x-ray source 102 may be a synchrotron or gamma-ray source to provide monochromatic x-rays. As discussed below, it may be advantageous to perform the CT scans with a monochromatic x-ray source 102. Alternatively, x-ray source 102 may be polychromatic. In this case, one may perform the CT scans with a polychromatic x-ray source and filter the polychromatic source to narrow the energy distribution to approximate a monochromatic x-ray source. In some embodiments, multiple x-ray sources 102 (e.g., both a minifocus tube and a microfocus tube) are provided for CT system 100.

Figure 1B:
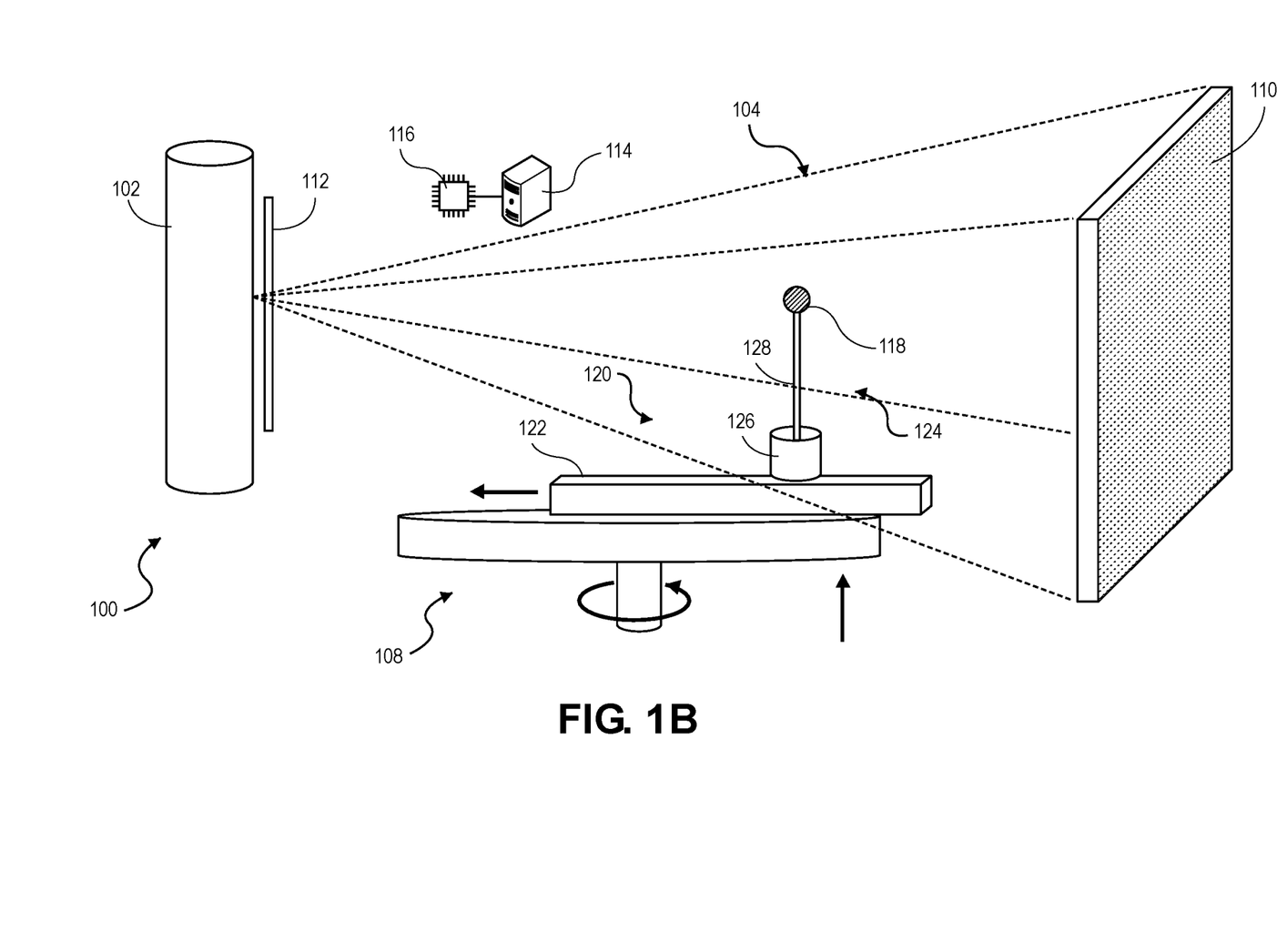
FIG. 1B illustrates the computed tomography system for scanning a defect phantom for some embodiments.

X-ray source 102 may be configured to emit x-ray beam 104, as a full cone x-ray beam (FIG. 1A) or as a fan x-ray beam (FIG. 1B). A full cone x-ray beam comprises divergent x-rays that form a full cone. A full cone x-ray beam may allow for the entirety of object 106 to be scanned in a single rotation of manipulator 108. A fan x-ray beam comprises a substantially thin x-ray beam 104 from which a thin region or slice may be reconstructed. Multiple slices may then be obtained to reconstruct the entirety of object 106. A fan x-ray beam may have a slice thickness of less than about 1 millimeter to about 10 millimeters.

In some embodiments, x-ray source 102 is filtered with one or more filters 112. Filter 112 may be positioned in the path of x-ray beam 104, between x-ray source 102 and object 106, and/or may be integral to x-ray source 102. Filter 112 may be configured to absorb lower-energy photons (e.g., about less than 30 keV) from x-ray beam 104, thereby narrowing a polychromatic x-ray beam 104 to a near monochromatic x-ray beam 104. As the energy of the CT scan increases, the energy level of the photons absorbed by filters 112 may increase accordingly. Broadly, filter 112 may be configured to absorb photons such that x-ray beam 104 may be approximated as monochromatic. As x-ray beam 104 is narrowed from polychromatic to near monochromatic, the reconstruction of the multi-scan CT acquisition described in embodiments herein may be improved such that internal defects may be accurately represented within an object 106. As discussed below, Beer-Lambert's law, which serves as the basis for the back projection reconstruction algorithm commonly used to reconstruct CT data, assumes a monoenergetic radiation exposure. Thus, filtering x-ray beam 104 to near monochromatic may increase the quality of the reconstructed image in a multi-scan acquisition. In some embodiments, filter 112 comprises at least one of copper, tin, lead, brass, aluminum, nickel, or any combination thereof. In some embodiments, filter 112 comprises a thickness of less than about 1 millimeter to about 10 millimeters. Multiple filters 112 may be used and placed successively to one another. For example, a first filter 112 of copper and a second filter 112 of nickel may be used in combination.

Object 106 may be disposed on manipulator 108 to position object 106 within the path of X-ray beam 104. Broadly, object 106 may be any part that is desired to have the internal conditions thereof imaged by CT system 100. As one example, object 106 may be an additively manufactured part. Additively manufactured parts may suffer from various internal defects, such as pores, cracks, and/or material inclusions, that can result in poor mechanical properties. As another example, object 106 may be a casted part and may be inspected to ensure no cracks or irregularities are present. As discussed below, object 106 may be a defect-free part such that the only defects present in a reconstruction of object 106 are the added phantom defects.

In some embodiments, manipulator 108 may be integral to the CT system 100. Manipulator 108 may comprise a rotatable turntable for rotating during operation of CT system 100 such that object 106 may be scanned at all possible angles. In a CT system 100, angle or orientation of object 106 is typically defined such that when object 106 is in-line with x-ray source 102 and at a maximum distance away from x-ray source 102, object 106 is considered to be at 0°. The angle may increase as manipulator 108 rotates object 106 clockwise. Manipulator 108 may also be configured to translate vertically. Various other configurations of manipulator 108 are contemplated for embodiments herein. Broadly, manipulator 108 may be any type of manipulator 108 and may be operable to move about one, two, three, four, five, or six axes. In some embodiments, x-ray source 102 and detector 110 are held substantially stationary while manipulator 108 moves during the scan. In some embodiments, manipulator 108 is held substantially stationary, and x-ray source 102 and detector 110 are configured to rotate about manipulator 108. In some embodiments, CT system 100 is configured to perform a helical scan. In a helical scan, manipulator 108 may simultaneously, or nearly simultaneously, rotate object 106 and move object 106 vertically. Thus, cross-sections of object 106 may be reconstructed with orthogonal geometry which may eliminate artifacts that are often present in traditional CT scans.

As described above, when photons of x-ray beam 104 pass through object 106, the photons are attenuated before reaching detector 110. Detector 110 may receive the attenuated photons whereby an electrical response is generated. Computer 114 may then convert the electrical response to a projection that comprises a visual representation of the raw data from the CT scan. A reconstruction algorithm (e.g., filtered back projection) may be applied to the projection data to generate a reconstructed dataset. Detector 110 may be a scintillation-based detector, an energy-discriminating detector, a linear detector array (LDA), a digital detector array (DDA), or any other type of detector 110 for receiving photons and generating sinograms therefrom. An LDA detector 110 may be used for a fan x-ray beam 104, and a DDA detector 110 may be used for a full cone x-ray beam 104. In some embodiments, the distance between x-ray source 102 and detector 110 is held substantially constant for all scans in the multi-scan process.

Figure 4:
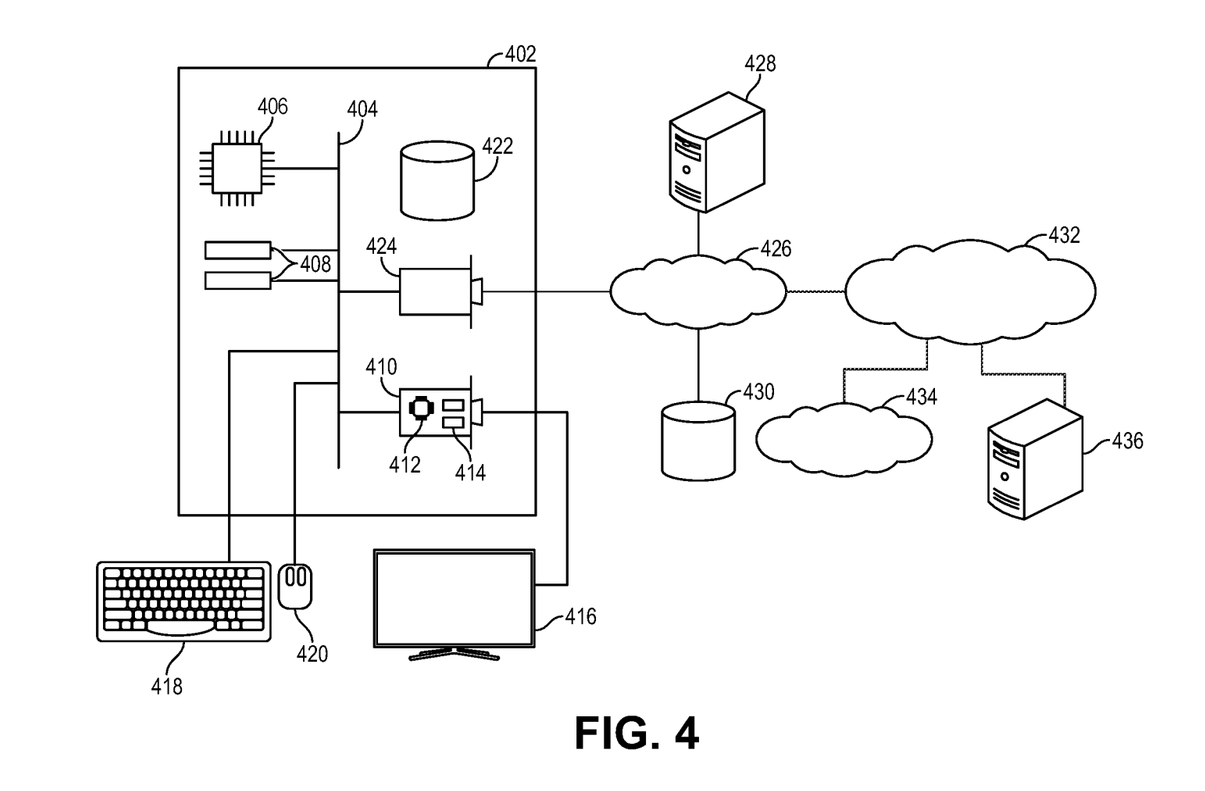
FIG. 4 illustrates an exemplary hardware platform for certain embodiments of the invention.

CT system 100 may be communicatively coupled to computer 114. Computer 114 may control operations of CT system 100 by executing computer-executable instructions. The computer-executable instructions may be stored on computer 114 in some embodiments. Computer 114 may comprise one or more non-transitory computer-readable media storing computer-executable instructions that, when executed by at least one processor (e.g., such as within controller 116), control the operations of CT system 100. With reference to FIG. 4, computer 114 may be a desktop computer, a laptop, a mobile phone, a tablet, a virtual machine, or the like. In some embodiments, computer 114 is a remote computing system remotely connected to CT system 100. In some embodiments, computer 114 is integrated with CT system 100. Controller 116 may comprise at least one controller, a transmitter, a receiver, a server, a processor, a memory, or any combination thereof and any components necessary for electrically communicating information between components and connecting to a local network and the Internet via a wired or wireless communication medium. Computer 114 may comprise an associated display for displaying reconstructed images and volumes to a user.

As described above, determining the defect detectability of an object 106 may comprise a multiple scan approach, with a first scan taken of object 106. Object 106 may be a defect-free object 106 such that only defects that are added by the user are displayed in the reconstructed data. CT system 100 may take a first scan of object 106 to obtain a first dataset. The first dataset may comprise the projection data from the scan of the object 106. Object 106 may make one or more full rotations on manipulator 108 for the first scan, and projections may be produced for a plurality of angles of the full rotation. The first dataset may be stored and accessible by computer 114 for reconstruction of the first dataset. In some embodiments, volumetric and/or positional data for object 106 is extracted from the scan and stored within computer 114. The volumetric and/or positional data may then be used to position the phantom defect at an appropriate location on manipulator 108 such that the defect may be represented internally to object 106 as discussed below. Alternatively, or additionally, the volumetric and/or positional data of object 106 may be determined using various sensors, such as lasers and/or cameras, and stored with computer 114.

Turning now to FIG. 1B, CT system 100 is illustrated with a phantom defect 118 on manipulator 108 with object 106 removed therefrom. As described above, a separate, second scan of a phantom defect 118 may be taken to represent defects in object 106. Phantom defect 118 may be formed to approximate a defect in object 106. For example, if object 106 is an additively manufactured part that, when printed, may have a substantially spherical void having a diameter of about 0.2 millimeters, phantom defect 118 may be formed as a sphere having about a 0.2 millimeter diameter. Similarly, phantom defect 118 may be formed to approximate the size and shape of cracks, other voids, and inclusions that may appear in object 106. Phantom defects 118 may be positioned within CT system 100 at a location corresponding to a position within object 106 at which a defect is desired to be represented. Thus, phantom defect 118 may be positioned within a volume defined by object 106. In some embodiments, phantom defects 118 are distinguished between void phantom defects 118 and inclusion phantom defects 118.

The material choice of phantom defect 118 may depend on whether phantom defect 118 is representing a void or an inclusion in object 106. When representing a void, phantom defect 118 may comprise the same material, or a substantially similar material (i.e., a material having a similar density), to object 106. The material of object 106 is hereinafter referred to as the base material. Thus, for example, if object 106 comprises aluminum, phantom defect 118 may also comprise aluminum. If object 106 comprises multiple materials, a void phantom defect 118 may comprise the base material of object 106 at the desired location of the defect. Broadly, when representing voids, phantom defect 118 may comprise a material that attenuates photons substantially similarly to the base material of object 106. When phantom defect 118 is representing an inclusion, phantom defect 118 may comprise the material of the expected inclusion, or a material that attenuates photons similarly to the inclusion material. The inclusion material may be distinct from the base material. In some embodiments, inclusion phantom defect 118 is configured to represent the erroneous addition of material to a designed-in gap or void in an object 106. In some such embodiments, phantom defect 118 may comprise the base material of object 106.

To represent a void within object 106, a void phantom defect 118 may be positioned at the desired location within CT system 100 and a scan taken thereof to obtain a second dataset. The second dataset may then be subtracted from the first dataset of the scan of object 106, thereby removing material from object 106 to create a void therein.

To represent an inclusion, the first scan of object 106 may be taken and the void phantom defect 118 may be scanned to obtain a second dataset as described above. Thereafter, the inclusion phantom defect 118 may be scanned to obtain a third dataset. It should be noted that the scans of object 106 and phantom defects 118 may be performed in any order in embodiments described herein. It may be advantageous to scan object 106 prior to scanning phantom defects 118 to properly position phantom defects 118 based on the location of object 106 as described above. After scanning the void and inclusion phantom defects 118, the second dataset from the void phantom defect 118 may be subtracted from the first dataset from object 106 to obtain a combined dataset, such as if a void was being represented within object 106. Thereafter, the third dataset may be added to the combined dataset to add the inclusion represented by the second phantom defect 118 to object 106 to obtain a further combined dataset. The void phantom defect 118 and the inclusion phantom defect 118 may be positioned at the same location and may comprise the same geometry. Thus, the inclusion phantom defect 118 may occupy the volume left by removing the void phantom defect 118 from object 106. The adding and subtracting of CT scans is discussed in further detail below.

As described above, Beer-Lambert's law may be used for reconstructing images and combining phantom defects 118 with object 106 to represent internal defects thereof. Beer-Lambert's law describes the linear attenuation in a material given an energy-dependent attenuation coefficient μ of the material. Beer-Lambert's law may be leveraged to combine the scans of object 106 and phantom defects 118 to represent internal defects. Beer-Lambert's law may be approximated for a polychromatic beam as reproduced in Eq. 1 below.

$$I(E) = I_0(E) e^{-\int S\mu(S,E)dS} \qquad \text{(Eq. 1)}$$

In Eq. 1, I represents the radiation intensity through a given material, with the intensity of each material a function of the photon energy E, and S represents the path along which the photons are traveling. The polychromatic approximation of Beer-Lambert's law is used as the basis for the back projection reconstruction algorithm commonly used to reconstruct images and volumes from projection data. As described above, filters 112 may absorb lower-energy photons from x-ray source 102. Thus, after the photons pass through filter 112, the output energy spectrum differs (comprising higher-energy photons) from the energy spectrum input to filter 112. Because a detector 110 on common CT systems 100 is energy-integrating and does not discriminate based on photon energy, the shift in the energy spectrum caused by filter 112 is undetectable by detector 110. Thus, detector 110 measures an energy-independent intensity, rather than the energy-dependent intensity outlined in Eq. 1. Consequently, due to the assumption of the back projection reconstruction algorithm of a monochromatic exposure, while the x-ray beam 104 is polychromatic in practice, common artifacts often result that may be mitigated by filtering x-ray source 102 and/or with pre- and post-processing operations, as discussed below.

To combine datasets for representing internal defects, Eq. 1 may be written for each of: air between x-ray source 102 and detector 110 (Eq. 2); an object 106 between x-ray source 102 and detector 110 (Eq. 3b); and a phantom defect 118 between x-ray source 102 and detector 110 (Eq. 5). Using the resulting equations outlined below, it can be shown that the addition of two materials (e.g., base material of object 106 and an inclusion material of phantom defect 118) can be represented as the product of the air-normalized intensities of the materials, as shown in Eq. 6. As described above, the source-to-object distance may be held substantially constant for each scan.

First, consider that only air is present between x-ray source 102 and detector 110, separated by a distance, D. Eq. 1 may be rewritten to describe the output radiation at a given energy, E, to arrive at Eq. 2.

$$I_{air}(E) = I_0(E) e^{\mu_{air}(E) D} \quad \text{(Eq. 2)}$$

Now, consider an object 106 placed between x-ray source 102 and detector 110. Taking into account the attenuation through the air gap, the radiation intensity may be written as:

$$I_{part}(E) = I_0(E) e^{-\mu_{air}(E)D} e^{-\int_S (\mu(S,E) - \mu_{air}(E)) dS} \quad \text{(Eq. 3a)}$$

Eq. 3a may be simplified by replacing the first set of terms, $I_0(E) e^{-\mu_{air}(E)D}$, with $I_{air}$ from Eq. 2 and using an air-adjusted coefficient, $\mu'(S,E) = \mu(S,E) - \mu_{air}(E)$.

$$I_{part}(E) = I_{air}(E) e^{-\int_S \mu'(S,E) dS} \quad \text{(Eq. 3b)}$$

To represent an inclusion of a material having an attenuation $\mu_i$ and thickness $t_i$, placed in x-ray beam 104, the intensity can be written as:

$$I_{inclusion}(E) = I_{air}(E) e^{-\mu_i'(E) t_i} \quad \text{(Eq. 4)}$$

With the inclusion placed in-line with the part, the air-normalized intensity may be written as:

$$\frac{I_{combined}(E)}{I_{air}(E)} = e^{-\int_S \mu'(S,E) ds} e^{-\mu_i'(E) t_i} = \frac{I_{object}(E)}{I_{air}(E)} \frac{I_{inclusion}(E)}{I_{air}(E)} \quad \text{(Eq. 5)}$$

Thus, using Eq. 5 the datasets from separate scans of object 106 and phantom defect 118 may be added together using the product of the air-normalized intensities. Similarly, the subtraction of materials (i.e., the creation of a void) can be represented by the quotient of the air-normalized intensities of the materials, as shown in Eq. 6.

$$\frac{I_{void}(E)}{I_{air}(E)} = \left[\frac{I_{object}(E)}{I_{air}(E)}\right] / \left[\frac{I_{base}(E)}{I_{air}(E)}\right] \quad \text{(Eq. 6)}$$

In Eq. 6, $I_{base}$ represents the intensity of the base material removed from object 106. Thus, as shown by Eq. 5 and Eq. 6, because the addition of materials (i.e., inclusions) may be represented by the product of the material's air-normalized intensities, and the subtraction of materials (i.e., voids) may be represented by the quotient of the material's air-normalized intensities, to represent any combination of plus material (inclusions) and minus material (voids), Eq. 7 may be used.

$$\frac{I(E)}{I_{air}(E)} = \frac{I_{object}(E)}{I_{air}(E)} \frac{\prod_i (I_{plus}(E)/I_{air}(E))_i}{\prod_i (I_{minus}(E)/I_{air(E)})_i} \quad \text{(Eq. 7)}$$

The left-hand side of Eq. 7 thus represents the radiation intensity of x-ray source 102 that reaches detector 110 after attenuation through air and material. Thus, any combination of materials and defects may be represented by combining the series of individual exposures. It should be noted that Eqs. 1-7 hold true for polychromatic x-ray sources 102 as the intensities I are a function of the photon energy E and may be used when detector 110 is configured to measure radiation intensity as a function of energy (i.e., an energy-discriminating detector). For a monochromatic x-ray source 102, the energy dependence E may be removed from Eqs. 1-7, as shown in Eq. 8. As described above, typical reconstruction algorithms used to reconstruct the CT scans assume a monochromatic x-ray beam 104 and detector 110 typically does not detect intensity I, as a function of energy, E, but rather measures an effective attenuation that is not dependent on energy, E. Thus, x-ray beam 104 may be filtered using filter 112 to approximate a monochromatic x-ray beam 104 to help reduce artifacts resulting because x-ray beam 104 is polychromatic in practice.

$$\frac{I}{I_{air}} = \frac{I_{object}}{I_{air}} \frac{\prod_i (I_{plus}/I_{air})_i}{\prod_i (I_{minus}/I_{air})_i} \quad \text{(Eq. 8)}$$

Returning now to FIG. 1B, in some embodiments, manipulator 108 may be configured with a positioning apparatus 120 for positioning phantom defect 118. Typical CT systems 100 comprise a manipulator 108 on which object 106 may be rotated as previously described. To position phantom defect 118 at a desired location within the volume defined by object 106, positioning apparatus 120 may be added to manipulator 108. Positioning apparatus 120 may comprise a stage 122 and a phantom defect holder 124.

Stage 122 may be substantially rectangular, square, circular, or any other shape. In some embodiments, positioning apparatus 120 comprises multiple stages 122. In some embodiments, stage 122 is configured to translate linearly along manipulator 108. Thus, using the rotation and vertical translation provided by manipulator 108 and the linear translation provided by stage 122, phantom defect 118 may be positioned at substantially any location within the volume defined by object 106 to represent a defect at said location. Stage 122 may comprise various materials. It may be advantageous to form stage 122 with a low-attenuation material such that stage 122 is substantially hidden in the reconstructed dataset. In some embodiments, positioning apparatus 120 is communicatively coupled to computer 114 such that control of the positioning thereof is enabled via computer 114. For example, positioning apparatus 120 may comprise servo and/or stepper motors or the like and various sensors and controllers for positioning object 106 and/or phantom defect 118 at the desired location within CT system 100. In some embodiments, computer 114 comprises an associated user interface which may be used by a user to position object 106, phantom defects 118, and view the reconstructed datasets thereof. It should be noted that, while not shown in FIG. 1A, object 106 may also be positioned using positioning apparatus 120.

Phantom defect holder 124 may be coupled to stage 122. In some embodiments, phantom defect holder 124 is removably attached to stage 122. Thus, phantom defect holder 124 may be removed when scanning object 106 and reattached to stage 122 when scanning phantom defects 118. Phantom defect holder 124 may be configured to hold phantom defect 118 at the desired position within the volume defined by object 106. In some embodiments, phantom defect holder 124 comprises a chuck 126 and a rod 128. Chuck 126 may be configured to support rod 128. Chuck 126 may be keyed or keyless. Rod 128 may comprise carbon fiber and may have a distal end on which phantom defect 118 may be attached or supported. Broadly, rod 128 should comprise a material strong enough to support phantom defect 118 during the CT scan and avoids transmitting vibrations thereto. A rod 128 comprising a low-attenuating material may be advantageous to hide rod 128 in the resulting image. In some embodiments, post-processing is performed on the reconstructed dataset to remove, all or a subset, of positioning apparatus 120 therefrom. Multiple phantom defect holders 124 may be attached to stage 122 such that multiple phantom defects 118 may be scanned simultaneously. Each phantom defect 118 may be positioned at a unique position within the volume defined by object 106. The phantom defect holder 124 may be coupled to stage 122 using screws, clamps, or any other fasteners. While chuck 126 and rod 128 are illustrated, any mechanism of holding phantom defect 118 at the desired position is contemplated for embodiments herein.

Figure 2:
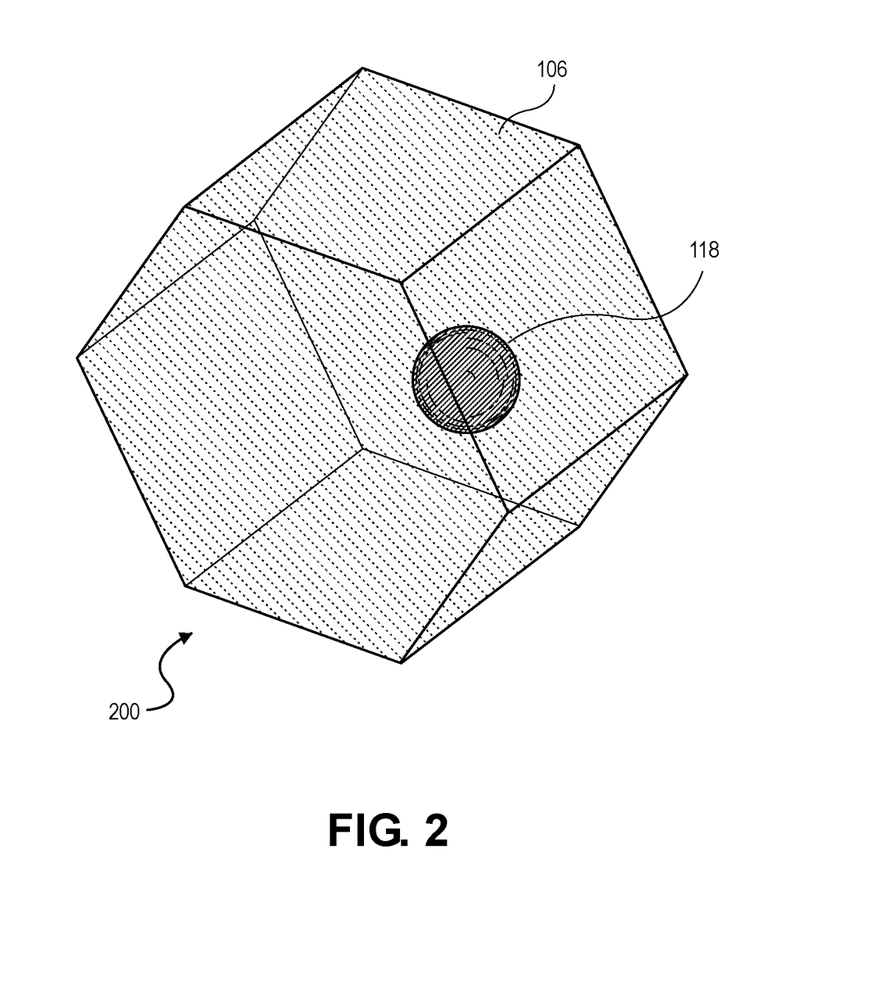
FIG. 2 illustrates an example reconstructed volume for some embodiments.

FIG. 2 illustrates an example reconstructed volume 200 representing an inclusion phantom defect 118 within object 106 for some embodiments. Reconstructed volumes 200 are typically displayed in grayscale with lower attenuating materials appearing as a darker shade of gray (represented by the thinner dashed lines in object 106) than higher attenuating materials (represented by the thicker lines in phantom defect 118). As shown, after combining the datasets from the scan of object 106 and the scans of void phantom defects 118 and (optionally) inclusion phantom defects 118, the datasets may be reconstructed to generate reconstructed volume 200. Reconstructed volume 200 may comprise object 106 with phantom defect 118 at the location within object 106 based on where phantom defect 118 was positioned on manipulator 108 when scanned. Thus, if the phantom defect 118 is detectable in reconstructed volume 200, any similar defect present in a production part of object 106 may be detectable by CT system 100. The multi-scan CT approach to represent internal defects in an object 106 may then be leveraged to create an accurate reference standard without the need to fabricate an expensive and inflexible reference standard. Further, the multi-scan CT approach can be easily implemented in existing CT systems 100.

Figure 3:
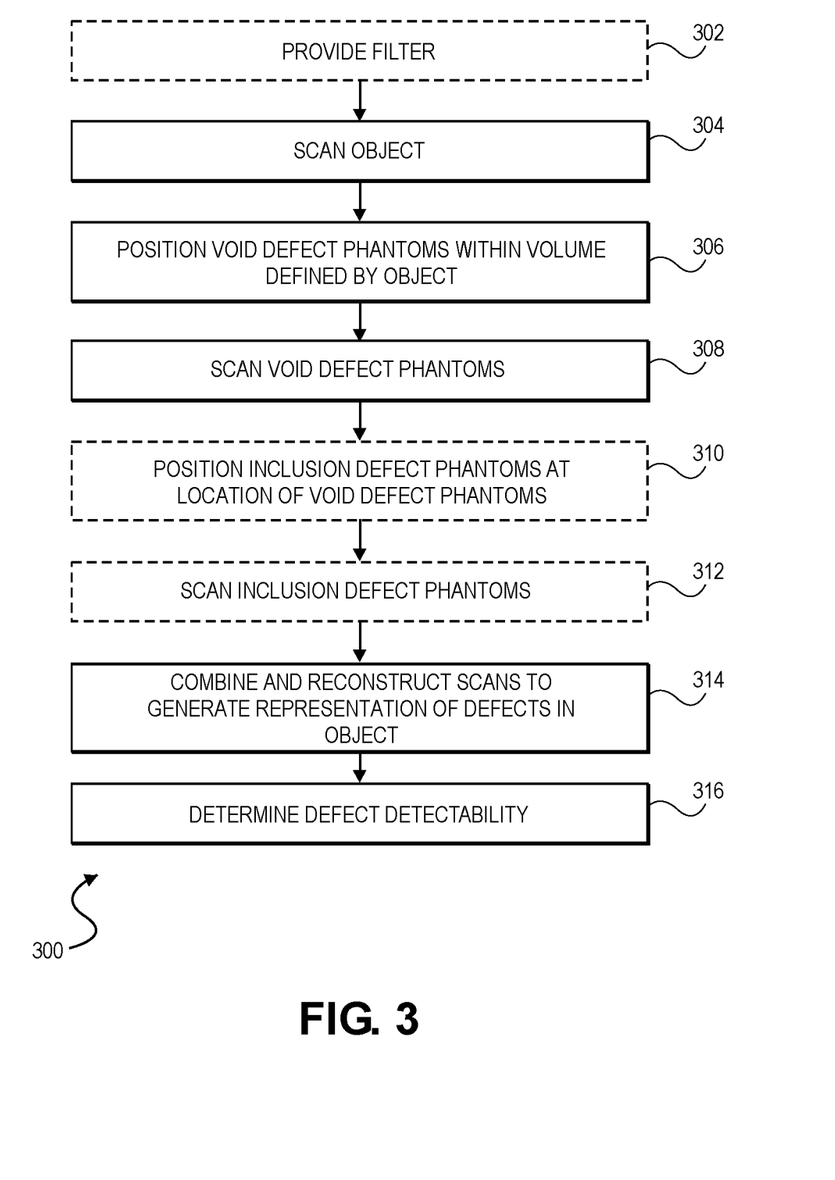
FIG. 3 illustrates an exemplary method for representing internal defects in objects for determining defect detectability using multiple computed tomography scans for some embodiments.

FIG. 3 illustrates an exemplary method 300 for representing one or more phantom defects 118 in an object 106 for some embodiments. The phantom defects 118 may be an inclusion or a void. A void may be any shape and size of absence of material in object 106. An inclusion may be any shape and size of material erroneously included in object 106. At optional step 302, a filter 112 may be provided for x-ray source 102. As described above, filtering x-ray beam 104 to approximate a monochromatic x-ray beam 104 may improve the accuracy of the reconstructed volume 200 for the multi-scan CT process. For example, a tungsten x-ray source 102 with a nickel filter 112 (with the appropriate thickness) may be used to produce a nearly monochromatic x-ray beam 104.

At step 304, a scan of object 106 may be performed. The object scan may be either a full cone beam scan, a fan beam scan, a helical scan, or any other type of scan. X-ray beam 104 may pass through object 106 whereby the photons are attenuated and received at detector 110. When received at detector 110, the photons may cause an electrical response when striking detector 110, which may be converted by computer 114 to produce a projection. The projection from the object scan may be saved as a first dataset for reconstruction. The positional data of object 106 within CT system 100 may also be extracted from the scan. For example, the volume occupied by object 106 may be recorded. In some embodiments, the positional data is extracted from the object scan data. Thereafter, object 106 may be removed from CT system 100.

At step 306, one or more void phantom defects 118 may be positioned at the desired location in CT system 100. In some embodiments, phantom defects 118 are positioned using positioning apparatus 120 as described above. Phantom defects 118 may also be manually positioned in CT system 100. The location of phantom defect 118 may be determined based on the location of object 106 during the scan thereof at step 304. Positioning apparatus 120 may be configured to position each phantom defect 118 at a specified position in a lateral plane, and manipulator 108 may rotate and adjust the vertical positioning of phantom defect 118. Thus, for example, a user may elect to position a phantom defect 118 at a distance from a reference point on object 106 (e.g., about 0.5 millimeters below a top surface of object 106), and CT system 100 may automatically move manipulator 108 and positioning apparatus 120 to position phantom defect 118 at the desired position. As another example, the user may instruct positioning apparatus 120 (e.g., via computer 114) to position phantom defect 118 at a specific position in an X, Y, Z coordinate system associated with CT system 100. Each phantom defect 118 for representing a void may comprise the base material of object 106 or a material that attenuates x-ray beam 104 similarly to the base material. Thereafter, at step 308, void phantom defects 118 may be scanned to produce a void phantom dataset. Alternatively, phantom defects 118 may be scanned individually and/or in batches to represent all desired defects in object 106.

Next, at optional step 310, inclusion phantom defects 118 may be positioned in CT system 100. Inclusion phantom defects 118 may be positioned at the same location as their corresponding void phantom defects 118. The inclusion phantom defects 118 may be positioned using positioning apparatus 120 as described above. Thereafter, at optional step 312, the inclusion phantom defects 118 may be scanned to obtain an inclusion phantom dataset.

At step 314, the datasets may be reconstructed to produce a reconstructed volume 200. The datasets may be reconstructed using reconstruction techniques and algorithms such as filtered back projection reconstruction, iterative reconstruction, deep learning reconstruction methods, or any combination thereof to reconstruct the projections. To represent voids, the void phantom dataset may be subtracted from the object dataset to obtain a combined dataset. To represent inclusions, the inclusion phantom dataset may be added to the combined dataset to obtain a further combined dataset. Thus, the inclusion may occupy the space left by subtracting the void from object 106. As described above, the combination of the datasets may comprise subtracting and/or adding the intensities of the materials as described by Eq. 8.

At step 316, the defect detectability of object 106 may be determined. In some embodiments, the defect detectability of object 106 is determined visually. The user may view the reconstruction (e.g., via computer 114) to determine if the defects are visible in the reconstructed volume 200. If the defects are visible, the user may know that such a defect occurring in a production part of object 106 may be visible in a CT scan thereof. Thus, quality assurance of object 106 may be accurately performed using a CT system 100.

In some embodiments, various techniques and algorithms may be utilized for quantitatively determining the defect detectability of object 106. For example, segmentation algorithms for analyzing pixels and voxels to identify different segments (e.g., voids and inclusions) of reconstructed volume 200, such as hysteresis thresholding, region growing, Sobel 3D, Sobel 5D, Canny, or any combination thereof, may be used for defect detectability. As another example, metrics such as contrast-to-noise ratio may be computed and a "detectable" defect in an object 106 may be defined as a reconstructed volume 200 having a contrast-to-noise ratio above a predefined threshold. Similarly, various machine learning techniques for analyzing reconstructed volume 200 to detect defects may be used in conjunction with embodiments described herein. For example, any deep learning model (e.g., convolutional neural networks, recurrent neural networks, long short term memory, encoder-decoders, generative adversarial networks, etc.) and/or machine learning technique for edge and/or segmentation analysis may be used to analyze reconstructed volume 200.

In some embodiments, the reconstructed volume 200 may undergo various pre- and/or post-processing effects to increase the image quality thereof. As one example, a misalignment correction may be performed if a halo effect is detected in the reconstructed volume 200. A halo effect may occur when positioning multiple phantom defects 118 near the same position. For example, when representing an inclusion in object 106, a void phantom defect 118 and an inclusion phantom defect 118 may be scanned at nearly the same location in separate scans as described above. If the phantom defects 118 are not placed in the same spot (e.g., the inclusion phantom defect 118 is erroneously shifted to the right about 0.5 millimeters relative to the void phantom defect 118), a halo effect may be present in the reconstructed volume. Thus, a pre-processing misalignment correction may be performed to realign the phantom defects 118. For misalignment correction, the phantom defects 118 may be located in the combined dataset and either or both of the misaligned defects may be shifted to correct the misalignment. As another example, pre-processing may be performed to remove phantom defect holder 124 from the projection. Phantom defect holder 124 may be removed (either manually or automatically) with the rest of the content in the image being replaced by background signal.

Other processing effects/algorithms that may be applied include, but are not limited to, contour detection method, gamma correction, pseudo-color, stitching algorithms, filtering algorithms, and the like. In some embodiments, smoothing algorithms may be applied to reduce noise in the reconstructed volume 200. In some embodiments, sharpening filters may be applied to enhance edges and the spatial resolution in the reconstructed volume 200. In some embodiments, multiplanar reformatting may be applied to change the orientation of the reconstructed volume 200.

FIG. 4 illustrates an exemplary hardware platform for certain embodiments of the invention. Computer 402 can be a desktop computer, a laptop computer, a server computer, a mobile device such as a smartphone or tablet, or any other form factor of general- or special-purpose computing device. Depicted with computer 402 are several components, for illustrative purposes. In some embodiments, certain components may be arranged differently or absent. Additional components may also be present. Included in computer 402 is system bus 404, whereby other components of computer 402 can communicate with each other. In certain embodiments, there may be multiple buses or components that may communicate with each other directly. Connected to system bus 404 is central processing unit (CPU) 406. Also attached to system bus 404 are one or more random-access memory (RAM) modules 408. Also attached to system bus 404 is graphics card 410. In some embodiments, graphics card 410 may not be a physically separate card, but rather may be integrated into the motherboard or the CPU 406. In some embodiments, graphics card 410 has a separate graphics-processing unit (GPU) 412, which can be used for graphics processing or for general purpose computing (GPGPU). Also on graphics card 410 is GPU memory 414. Connected (directly or indirectly) to graphics card 410 is display 416 for user interaction. In some embodiments no display is present, while in others it is integrated into computer 402. Similarly, peripherals such as keyboard 418 and mouse 420 are connected to system bus 404. Like display 416, these peripherals may be integrated into computer 402 or absent. Also connected to system bus 404 is local storage 422, which may be any form of computer-readable media, and may be internally installed in computer 402 or externally and removably attached.

Computer-readable media include both volatile and non-volatile media, removable and non-removable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 424 is also attached to system bus 404 and allows computer 402 to communicate over a network such as network 426. NIC 424 can be any form of network interface known in the art, such as Ethernet, ATM, fiber, Bluetooth, or Wi-Fi (i.e., the IEEE 802.11 family of standards). NIC 424 connects computer 402 to local network 426, which may also include one or more other computers, such as computer 428, and network storage, such as data store 430. Generally, a data store such as data store 430 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 428, accessible on a local network such as local network 426, or remotely accessible over Internet 432. Local network 426 is in turn connected to Internet 432, which connects many networks such as local network 426, remote network 434 or directly attached computers such as computer 436. In some embodiments, computer 402 can itself be directly connected to Internet 432.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

The invention claimed is:

1. A system for determining defect detectability of an object by representing internal defects in the object using computed tomography, the system comprising:
   at least one defect phantom;
   a positioning apparatus disposed on a manipulator of a computed tomography device; and
   one or more non-transitory computer-readable media storing computer-executable instructions that, when executed by at least one processor, perform a method of determining defect detectability of the object by representing internal defects in the object using computed tomography, the method comprising:
      receiving a first dataset from a first scan of the object;
      receiving a second dataset from a second scan of the at least one defect phantom, the at least one defect phantom disposed on the positioning apparatus,
      wherein the at least one defect phantom is configured to represent at least one of a void or an inclusion in the object;
      combining the first dataset and the second dataset to obtain a combined dataset;
      reconstructing the combined dataset to generate a reconstructed volume; and
      determining a defect detectability of the object using the reconstructed volume.

2. The system of claim 1, wherein combining the first dataset and the second dataset comprises subtracting the second dataset from the first dataset to represent the void in the object.

3. The system of claim 2,
   wherein the at least one defect phantom comprises a first defect phantom and a second defect phantom, and
   wherein the method further comprises:
      positioning the first defect phantom at a first position;
      positioning the second defect phantom at the first position;
      receiving a third dataset from a third scan of the second defect phantom; and
      combining the third dataset with the combined dataset to obtain a further combined dataset, the further combined dataset configured to represent the inclusion in the object.

4. The system of claim 3,
   wherein the object and the first defect phantom comprise a first material, and
   wherein the second defect phantom comprises a second material distinct from the first material.

5. The system of claim 1, wherein the positioning apparatus comprises:
   a stage configured to move linearly on the manipulator; and
   at least one defect phantom holder coupled to the stage for supporting the at least one defect phantom.

6. The system of claim 5, wherein the at least one defect phantom holder comprises a carbon fiber rod.

7. The system of claim 1 wherein the method further comprises:
   determining a position of the object based on the first scan; and
   positioning the at least one defect phantom on the manipulator based on the position of the object.

8. A method of determining defect detectability of an object by representing internal defects in the object using computed tomography, the method comprising:
   providing a computed tomography device;
   positioning the object on a manipulator of the computed tomography device;
   performing a first scan of the object using the computed tomography device to obtain a first dataset;
   removing the object from the manipulator;
   positioning a defect phantom on the manipulator at a location within a volume defined by the object;
   performing a second scan of the defect phantom using the computed tomography device to obtain a second dataset;
   combining the first dataset and the second dataset to obtain a combined dataset; and
   reconstructing the combined dataset to generate a reconstructed volume.

9. The method of claim 8, wherein positioning the defect phantom comprises moving the defect phantom linearly using a stage disposed on the manipulator.

10. The method of claim 9, further comprising disposing the defect phantom on an end of a rod coupled to the stage to position the defect phantom at the location within the volume defined by the object.

11. The method of claim 8, further comprising providing a filter to filter an x-ray beam from the computed tomography device to approximate a monochromatic x-ray beam.

12. The method of claim 11, wherein the filter comprises at least one of copper, tin, brass, aluminum, nickel, or lead.

13. The method of claim 8, further comprising:
   positioning an additional defect phantom on the manipulator at a location within a volume defined by the object;
   performing a third scan of the additional defect phantom using the computed tomography device to obtain a third dataset; and
   combining the combined dataset with the third dataset to represent an inclusion in the object.

14. One or more non-transitory computer-readable media storing computer-executable instructions that, when executed by at least one processor, perform a method of determining defect detectability of an object by representing internal defects in the object using computed tomography, comprising:
   performing a first scan of the object using a computed tomography device to obtain a first dataset, the object disposed on a manipulator of the computed tomography device;
   performing a second scan of at least one defect phantom using the computed tomography device to obtain a second dataset, the at least one defect phantom located within a volume defined by the object;
   combining the first dataset and the second dataset to obtain a combined dataset;
   reconstructing the combined dataset to generate a reconstructed volume; and
   determining a defect detectability of the object using the reconstructed volume.

15. The media of claim 14,
wherein the at least one defect phantom is disposed on a positioning apparatus coupled to the computed tomography device, and
wherein the positioning apparatus comprises at least one phantom defect holder and a stage configured to move linearly along the manipulator.

16. The media of claim 15, wherein the method further comprises performing at least one pre-processing operation on the combined dataset to remove the at least one phantom defect holder from the combined dataset.

17. The media of claim 14, wherein combining the first dataset and the second dataset comprises subtracting the second dataset from the first dataset to represent a void in the object.

18. The media of claim 14,
wherein each of the at least one defect phantom is positioned at a unique position within the volume defined by the object to represent a defect at said unique position.

19. The media of claim 14, wherein at least one of the first scan or the second scan comprises a full cone computed tomography scan.

20. The media of claim 14,
wherein the at least one defect phantom comprises a first defect phantom and a second defect phantom, and
wherein the method further comprises:
detecting a halo effect in the combined dataset; and
performing a misalignment correction on the combined dataset to reduce the halo effect.

* * * * *